United States Patent
Bae et al.

(10) Patent No.: US 11,659,547 B2
(45) Date of Patent: May 23, 2023

(54) EXISTENCE OF PERIODIC/SEMI-STATIC SIGNALS AND CHANNELS OUTSIDE OF CHANNEL OCCUPANCY TIME (COT)

(71) Applicant: Samsung Electronics Co., Ltd., Gyeonggi-do (KR)

(72) Inventors: Jung Hyun Bae, San Diego, CA (US); Hsien-Ping Lin, San Diego, CA (US)

(73) Assignee: Samsung Electronic Co., Ltd

( * ) Notice: Subject to any disclaimer, the term of this patent is extended or adjusted under 35 U.S.C. 154(b) by 179 days.

(21) Appl. No.: 17/130,437

(22) Filed: Dec. 22, 2020

(65) Prior Publication Data

US 2021/0258994 A1     Aug. 19, 2021

Related U.S. Application Data

(60) Provisional application No. 63/107,900, filed on Oct. 30, 2020, provisional application No. 63/021,873, filed on May 8, 2020, provisional application No. 63/000,074, filed on Mar. 26, 2020, provisional application No. 62/977,028, filed on Feb. 14, 2020.

(51) Int. Cl.
| | |
|---|---|
| *H04W 72/1273* | (2023.01) |
| *H04W 74/08* | (2009.01) |
| *H04W 72/0446* | (2023.01) |
| *H04W 72/23* | (2023.01) |
| *H04W 52/02* | (2009.01) |
| *H04W 72/50* | (2023.01) |

(52) U.S. Cl.
CPC ..... *H04W 72/1273* (2013.01); *H04W 52/0225* (2013.01); *H04W 72/0446* (2013.01); *H04W 72/23* (2023.01); *H04W 72/535* (2023.01); *H04W 74/0808* (2013.01)

(58) Field of Classification Search
CPC .......... H04W 72/1273; H04W 72/042; H04W 72/0446; H04W 72/1257; H04W 72/14; H04W 72/1289; H04W 72/1294; H04W 52/0209; H04W 52/0225; H04W 74/0808; H04L 69/28; H04J 3/0635; G06F 1/3228
See application file for complete search history.

(56) References Cited

U.S. PATENT DOCUMENTS

| | | | |
|---|---|---|---|
| 2019/0349180 A1* | 11/2019 | Lu | H04L 27/2607 |
| 2020/0313803 A1* | 10/2020 | Khoshnevisan | H04L 1/1854 |
| 2020/0314898 A1* | 10/2020 | Sun | H04W 74/0808 |
| 2020/0351847 A1* | 11/2020 | Kim | H04L 5/0096 |
| 2021/0022157 A1* | 1/2021 | Sun | H04W 72/1257 |
| 2021/0144564 A1* | 5/2021 | Nam | H04W 56/001 |
| 2021/0160870 A1* | 5/2021 | Si | H04L 5/0092 |
| 2022/0104216 A1* | 3/2022 | Wu | H04W 72/1257 |
| 2022/0217708 A1* | 7/2022 | Li | H04L 5/00 |

* cited by examiner

*Primary Examiner* — Joshua Kading
(74) *Attorney, Agent, or Firm* — The Farrell Law Firm, P.C.

(57) ABSTRACT

A method of a user equipment (UE) in a wireless communication network and a UE are provided. The method includes receiving, from the network, a downlink (DL) transmission, determining, by the UE, whether to cancel at least a portion of the DL transmission, and cancelling, by the UE, at least the portion of the DL transmission when the UE determines that the portion of the DL transmission is to be cancelled.

20 Claims, 5 Drawing Sheets

EXISTENCE OF PERIODIC/SEMI-STATIC SIGNALS AND CHANNELS OUTSIDE OF CHANNEL OCCUPANCY TIME (COT)

PRIORITY

This application is based on and claims priority under 35 U.S.C. § 119(e) to U.S. Provisional Patent Application Ser. No. 62/977,028, filed on Feb. 14, 2020, U.S. Provisional Patent Application Ser. No. 63/000,074, filed on Mar. 26, 2020, U.S. Provisional Patent Application Ser. No. 63/021,873, filed on May 8, 2020, and U.S. Provisional Patent Application Ser. No. 63/107,900, filed on Oct. 30, 2020, the entire contents of which are incorporated herein by reference.

FIELD

The present disclosure is generally related to reception of periodic or semi-static signals.

BACKGROUND

For New Radio unlicensed spectrum (NR-U), in order to achieve fair coexistence with other technologies using the same unlicensed spectrum, a channel access procedure is considered such that a device needs to sense the channel first and utilize the channel if the channel sensing outcome indicates the channel is available.

SUMMARY

According to one embodiment, a method of a user equipment (UE) in a wireless communication network includes receiving, from the network, a downlink (DL) transmission, determining, by the UE, whether to cancel at least a portion of the DL transmission, and cancelling, by the UE, at least the portion of the DL transmission when the UE determines that the portion of the DL transmission is to be cancelled.

According to an embodiment, a UE includes a transceiver, a memory and a processor configured to receive, from a network, a DL transmission, determine whether to cancel at least a portion of the DL transmission, and cancel at least the portion of the DL transmission when the UE determines that the portion of the DL transmission is to be cancelled.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The channel access procedure is referred to as listen-before-talk (LBT). Devices which employ LBT can be categorized into load based equipment (LBE) or frame based equipment (FBE). For LBE, channel sensing can occur at any instance for data transmission but a random back-off procedure is applied when the channel is sensed to be busy. For FBE, predetermined periodic channel access opportunities are applied and a fixed duration for data transmission followed by a fixed idle period are associated with each channel sensing. If a channel sensing procedure succeeds in FBE, the disclosed fixed duration for data transmission can be utilized. Otherwise, no access to the channel is allowed until the next channel access opportunity.

According to LBT, DL transmission is not guaranteed due to unpredictable channel access opportunity at network side. Although there is no enhancement on the DL transmission detection mechanism at the UE side in NR-U, DL transmissions can be associated to the detection of a physical downlink control channel (PDCCH) or a group common PDCCH (GC-PDCCH). For example, if LBE is considered, when a UE detects DCI, it is reasonable to assume network acquires the channel for a certain time such that the following DL transmissions can occur. In particular, when a UE is configured to monitor DCI format 2_0, COT information regarding network channel access status can be provided to the UE by a specific field in DCI format 2_0, if configured, or by the slot duration deduced from the slot format indicator (SFI) value in DCI format 2_0 otherwise. On the other hand, for FBE, although the channel access procedure is not guaranteed to succeed, the COT is fixed after each successful channel access procedure. Within the COT information, it can be assumed that network occupies the channel for the indicated duration or the configured duration by utilizing either a DL transmission from the network or a scheduled uplink (UL) transmission from the UEs. In other words, the unlicensed operation within the indicated COT can be similar to the licensed operation.

To accommodate the unpredictable channel access opportunity and to occupy the channel immediately after acquiring the channel at network side, it is desirable to have more DCI transmission opportunity for the network. Consequently, the corresponding UE PDCCH monitoring can be more frequent and power consuming. To reduce PDCCH monitoring power, two monitoring behaviors associated with two groups of search space sets can be configured to the UE such that the UE switches to a group of search space sets having less frequent PDCCH monitoring behavior when detecting an explicit switching trigger in DCI 2_0, if configured, or detecting any DCIs otherwise. To switch back to much frequent PDCCH monitoring configuration, several mechanisms are introduced in NR-U. The first mechanism is to utilize a specific switching trigger in DCI 2_0, if configured, such that the UE switches to the search space set having more frequent PDCCH monitoring behavior after detecting the trigger. The second mechanism relies on a timer configured to the UE. The start of the timer is associated with the switching from the search space set having more frequent monitoring behavior to the search space set having less frequent monitoring behavior. When the timer expires, the UE switches back to the more frequent PDCCH monitoring. Similarly, when the indicated COT ends, the UE switches back to a more frequent PDCCH monitoring accordingly.

For DL transmissions which are not associated with DCIs (e.g., periodic or semi-static signals/channels such as periodic CSI-RS, semi-persistent CSI-RS, semi-persistent scheduling physical downlink shared channel (SPS-PDSCH)), the corresponding reception at the UE side is not linked to the detection of DCIs and the UE proceeds to the reception at each configured occasions. However, it is not desirable for the UE to proceed such DL transmission without taking the unpredictable channel access outcome into account. For example, when a UE is configured for receiving periodic CSI-RS, the quality of the associated CSI report can be severely affected by the CSI-RSs which are not transmitted by the network due to associated channel access failure. Consequently, the actual channel quality is not reflected by the CSI report. Another example is the SPS-PDSCH reception. After the SPS-PDSCH is activated, the UE should report decoding results on a physical uplink control channel (PUCCH) for each configured SPS-PDSCH occasions, which can cause redundant PDSCH decoding and redundant PUCCH transmission at the UE side if the scheduled SPS-PDSCH is not transmitted by the network due to channel access failure. Therefore, it is preferred to define the UE behavior on the reception of periodic or semi-static signals/channels in an unlicensed spectrum with the consideration of a channel access status to avoid negative impact at the UE side.

The present disclosure provides methods for the UE to receive periodic and semi-static DL signals/channels in an unlicensed spectrum. In one embodiment, the UE utilizes the COT information indicated in DCI 2_0 to validate the DL transmission. In particular, when a UE is configured to monitor DCI 2_0, the UE conservatively assumes a DL transmission configured by a higher layer is successfully transmitted only if the associated occasions are located within the indicated COT.

Figure 1:
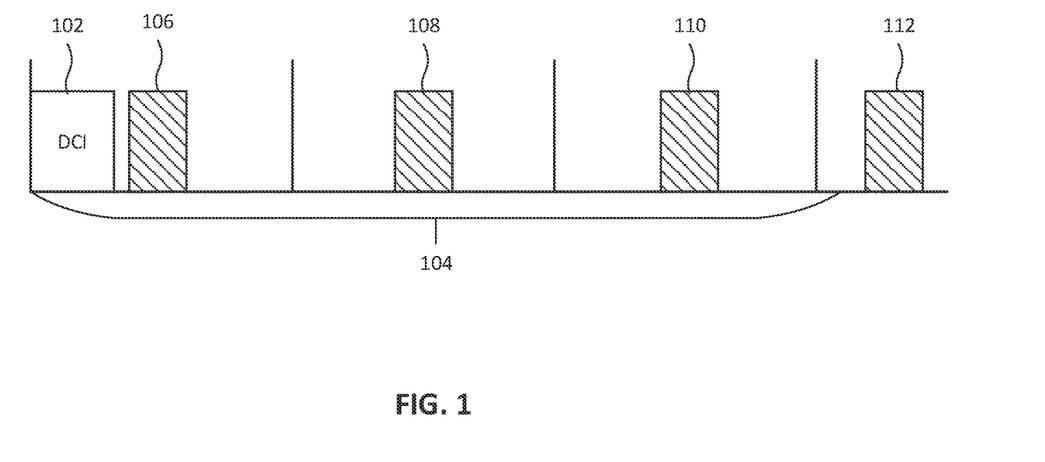
FIG. 1 illustrates a diagram of channel status information reference signal (CSI-RS) occasions occurring within a COT, according to an embodiment.

FIG. 1 illustrates a diagram of CSI-RS occasions occurring within a COT, according to an embodiment. As shown in FIG. 1, from the DCI 102, the UE can determine the COT 104, and in the example shown in FIG. 1, the CSI-RS occasions 106, 108 and 110 occur within the COT. However, the CSI-RS occasion 112 occurs outside of the COT 104. In this case, the UE determines that the CSI-RS occasion 112 does not exist and cancels the CSI-RS occasion 112.

In one embodiment, when a UE is configured to monitor DCI 2_0, the reception of a DL transmission configured by the higher layer is canceled if any part of the DL transmission is not within the COT indicated in DCI 2_0. The COT duration can be determined based on a specific bit-field in DCI 2_0 or SFI and validation of a DL transmission from a higher layer configuration has been established in a licensed spectrum with SFI in Rel-15. To consolidate the Rel-15 SFI validation rule with COT notion in an unlicensed spectrum, all the possible combinations on the configuration of a specific bit-field in DCI 2_0 and SFI are provided.

If only the specific bit-field for COT duration is configured in DCI 2_0, a DL transmission configured by a higher layer within the indicated COT duration can be ensured, provided that the DL transmissions fully overlap with semi-static DL symbols or any of the associated symbols of the DL transmissions don't overlap with any DCI scheduled UL transmission.

If only the SFI is configured in DCI 2_0, the DL transmission configured by a higher layer within the indicated COT duration can be ensured based on Rel-15 UE behavior (i.e., the associated symbols of the DL transmission are indicated as DL symbols in SFI). However, it is possible that DCI 2_0 with the SFI is not detected and slot formats from a higher layer configuration is applied in some slots. In this case, DL symbols indicated by the higher layer configuration are not verified by dynamic SFI information. Therefore, the UE should not validate the DL transmission configured by a higher layer on those unverified DL symbols.

If both the SFI and the specific bit-field for COT duration are configured, the DL transmission configured by a higher layer within the indicated COT duration from the specific bit-field for COT duration can be ensured based on Rel-15 UE behavior (i.e., the associated symbols of the DL transmission are indicated as DL symbols in the SFI). If DCI 2_0 is not detected and slot formats from a higher layer configuration is applied in some slots, then the UE should not validate the DL transmission configured by a higher layer on those unverified DL symbols.

One issue when both the SFI and the specific bit-field for COT duration are configured is that it is possible that the COT information derived by SFI is different to the COT information indicated by the specific bit-field. In this case, DL symbols indicated by the SFI might not be located within the COT information indicated by the specific bit-field and the associated UE behavior is not clear. To resolve the ambiguity, one embodiment includes ignoring the DL symbols indicated by the SFI if those symbols are outside of COT. An alternative is to follow the SFI based on the assumption that the configuration from the network closely reflects the channel access results (e.g., symbols outside of COT are indicated as flexible). However, in Rel-15, a DL/UL symbol configured by a semi-static slot format cannot be overridden by the SFI, which puts a restriction on the network side configuration such that the SFI might not closely follow the channel access result. Therefore, it is reasonable to assume that a DL/UL symbol configured by a semi-static slot format should be considered as flexible symbols if the symbol is not in a COT. On the other hand, the issue can be resolved by restricting the COT duration derived by the SFI to be covered by the one derived by the specific bit-field for COT information.

The above disclosure uses the COT information to ensure a DL transmission within the COT, which is available if monitoring DCI 2_0 is configured to the UE. For the cases where the COT information is not available to the UE, it is disclosed to utilize a timer to specify a duration where the network potentially occupies the channel. With the timer, the UE assumes a DL transmission configured by a higher layer is successfully transmitted if the associated occasions occurs when the timer is running. One example of the timer can be the one introduced for the switching groups of search space sets.

In another embodiment, when the COT information is not available to the UE, a timer can be configured such that the reception of a DL transmission configured by a higher layer is canceled if any part of the DL transmission occasion is not within the duration where a timer is running. One design of the timer is a timer introduced for the switching groups of search space sets.

In addition to COT information or the duration indicated by a timer, it is also reasonable to assume the existence of periodic and semi-static DL signals/channels if the occasions overlap with a set of received downlink transmissions whose gap is small, if any.

Figure 2A:
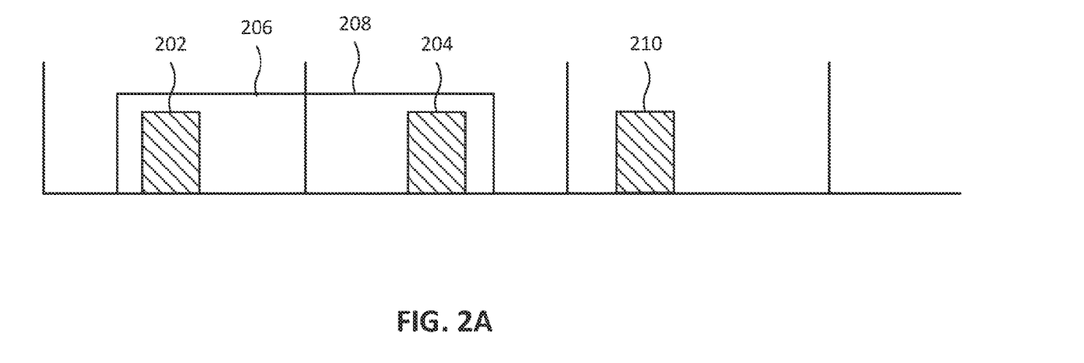
FIGS. 2A and 2B illustrate diagrams of CSI-RS occasions occurring within DL transmissions, according to an embodiment.
Figure 2B:
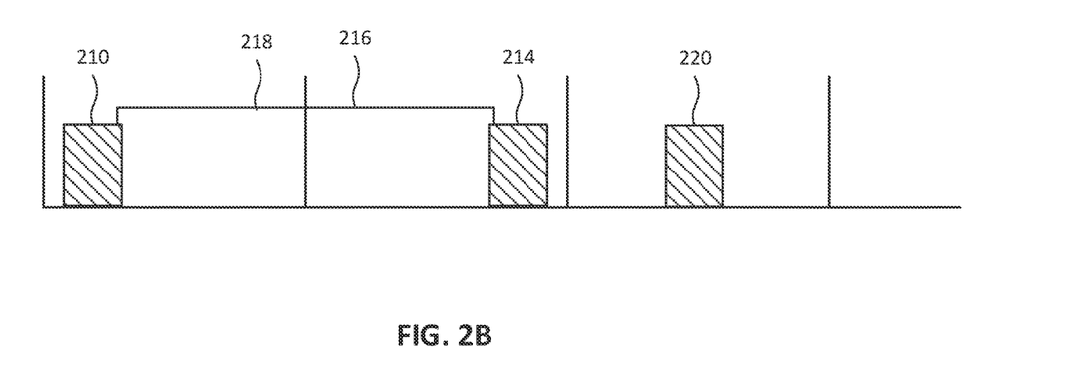

FIGS. 2A and 2B illustrate diagrams of CSI-RS occasions occurring within DL transmissions, according to an embodiment. In this embodiment, the UE can determine a DL transmission configured by a higher layer is transmitted if the DL transmission occasion is fully overlapped with a set of downlink transmissions with a small gap, if any. In FIG. 2A, the CSI-RS occasions 202 and 204 are within two DL transmissions 206 and 208. The UE determines that CSI-RS occasions 202 and 204 exist. However, the CSI-RS occasion 209 is outside the DL transmissions 206 and 208. The UE determines that CSI-RS occasion 209 does not exist and cancels the CSI-RS occasion 209. In FIG. 2B, the CSI-RS occasion 210 occurs before a first DL transmission 212, and the CSI-RS occasion 214 occurs after a second DL transmission 216. The UE determines that CSI-RS occasions 210 and 214 exist. However, the CSI-RS occasion 220 is outside the DL transmissions 216 and 218. The UE determines that CSI-RS occasion 220 does not exist and cancels the CSI-RS occasion 220.

It is possible that the network includes DL transmissions to many UEs in one channel occupancy time after a successful channel access procedure. In this case, DL transmissions received at each UE could have large gaps and even those received DL transmission are within a single channel occupancy time duration. To address the periodic and semi-static DL signals/channels existence assumption for this scenario, it is reasonable to assume a DCI and the scheduled PDSCH are within the same COT. Therefore, it is disclosed that periodic and semi-static DL signals/channels which are located between a DCI and the scheduled PDSCH can be assumed to exist.

Figure 3A:
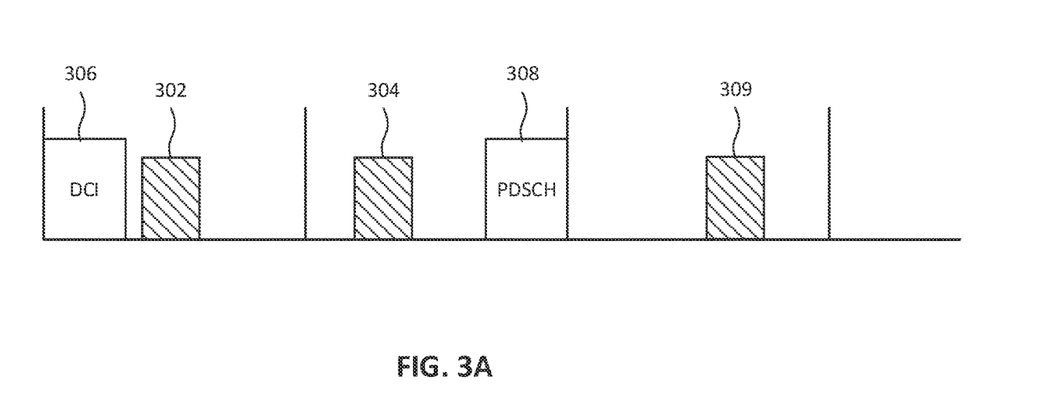
FIGS. 3A and 3B illustrate diagrams of CSI-RS occasions occurring between downlink control information (DCI) and a physical downlink shared channel (PDSCH), according to an embodiment
Figure 3B:
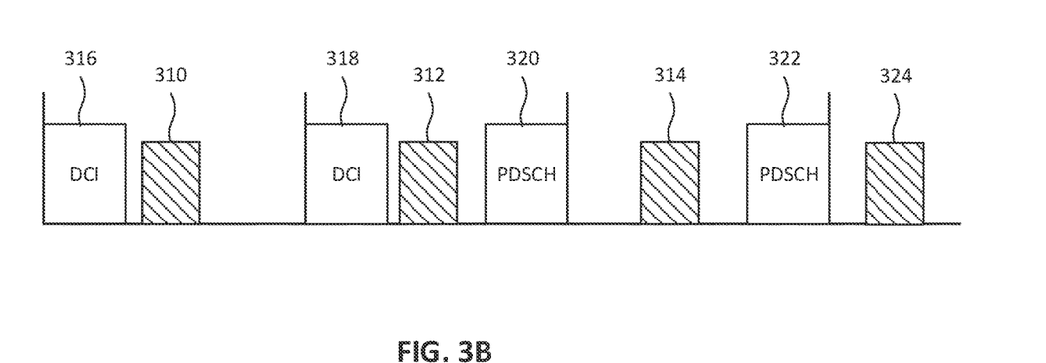

FIGS. 3A and 3B illustrate diagrams of CSI-RS occasions occurring between DCI and a PDSCH, according to an embodiment. As shown in FIG. 3A, the CSI-RS occasions 302 and 304 occur between the DCI 306 and the PDSCH 308. Therefore, the UE determines the CSI-RS occasions 302 and 304 to exist. However, the CSI-RS occasion 309 is outside the DCI 306 and 308. The UE determines that CSI-RS occasion 309 does not exist and cancels the CSI-RS occasion 309. In FIG. 3B, the CSI-RS occasion 310 occurs between a first DCI 316 and a first PDSCH 320. The CSI-RS occasion 312 occurs between a second DCI 318 and the first PDSCH 320. The CSI-RS occasion 314 occurs between the second DCI 318 and the second PDSCH 322. Therefore, the UE determines the CSI-RS occasions 310, 312 and 314 to exist. However, the CSI-RS occasion 324 is outside the DCI 316 and 318, as well as the PDSCH 320 and 322. The UE determines that CSI-RS occasion 324 does not exist and cancels the CSI-RS occasion 324. Moreover, if a set of downlink transmission can be deduced to be within the COT by utilizing the assumption that a detected DCI and the scheduled PDSCH are in the same COT, periodic and semi-static DL signals/channels which are part of the set of downlink transmission can be assumed to be transmitted.

In another embodiment, the UE can assume a DL transmission configured by a higher layer is transmitted if the DL transmission occasion is located in a COT deduced by the assumption that a DCI and the scheduled PDSCH are in the same COT. For FBE, due to the nature of the associated channel access procedure, each data transmission duration can be considered as a COT when the associated channel sensing is successful before the data transmission duration. Consequently, a UE can assume a DL transmission configured by higher layer is transmitted within the transmission duration if the UE detects any other DL transmission within the same transmission duration.

In another embodiment, for the FBE, due to the nature of the associated channel access procedure, each data transmission duration can be considered as a COT when the associated channel sensing is successful before the data transmission duration. Consequently, a UE can assume a DL transmission configured by a higher layer is transmitted within the transmission duration if the UE detects any other DL transmission within the same transmission duration.

For the FBE, the UE can assume a DL transmission configured by a higher layer is transmitted within the transmission duration if the UE detects any other DL transmission within the same transmission duration.

On the other hand, to address the potential blind detection issue on the periodic or semi-static DL transmission, the corresponding usage should be mitigated in unlicensed spectrum. To accommodate the lack of those periodic or semi-static DL transmissions, a dynamic DL transmission with the same functionality should be utilized as much as possible. Moreover, for dynamic signals/channels which are required to be configured with a dependence to a periodic signal/channel, the associated configuration should be relaxed such that an independent configuration to a periodic signal/channel is allowed. For example, aperiodic CSI-RS for tracking can only be configured with a correspondence to a period CSI-RS for tracking in current specification, which should be relaxed such that an independent configuration should be allowed for CSI-RS for tracking.

For an operation with shared spectrum channel access, if a UE is configured by higher layers to receive a CSI-RS and the UE is provided CO-DurationPerCell-r16, for a set of symbols of a slot that are indicated as downlink or flexible by tdd-UL-DL-ConfigurationCommon or tdd-UL-DL-ConfigurationDedicated, or when tdd-UL-DL-ConfigurationCommon and tdd-UL-DL-ConfigurationDedicated are not provided, the UE cancels the CSI-RS reception in the set of symbols of the slot that are not within the indicated remaining channel occupancy duration.

Figure 4:
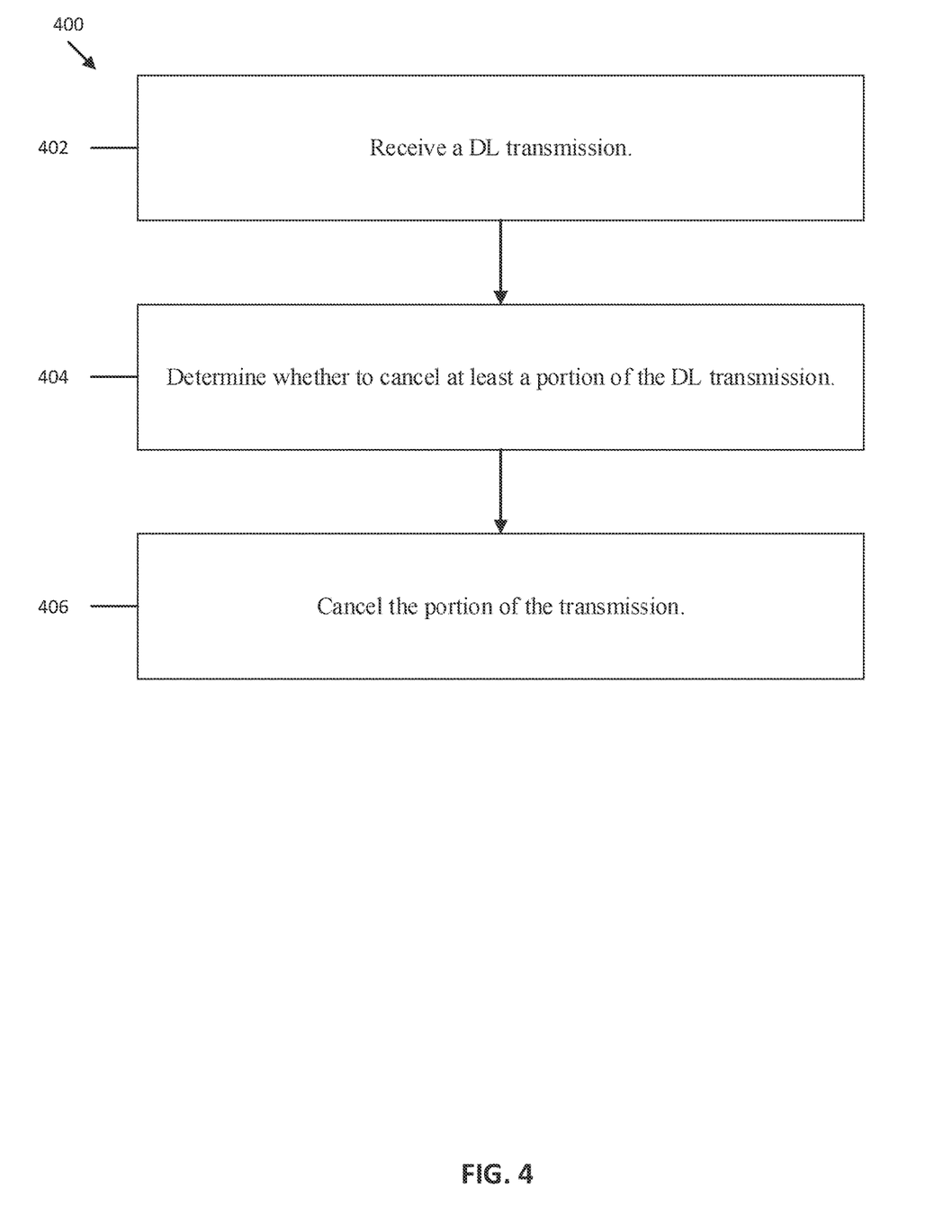
FIG. 4 illustrates a flowchart of a method of operating a UE, according to an embodiment.

FIG. 4 illustrates a flowchart 400 in a method of operating a UE, according to an embodiment. At 402, the UE receives a DL transmission. At 404, the UE determines whether to cancel at least a portion of the DL transmission. The UE may determine to cancel the entire DL transmission. The UE may determine to cancel the portion of the DL transmission when a part of the DL transmission is not within a COT. The UE may determine to cancel the portion of the DL transmission when a part of the DL transmission occasion is not within a predetermined duration of a timer. The UE may determine to cancel the portion of the DL transmission when the DL transmission does not overlap with a set of DL transmissions with a small gap. The UE may determine to cancel the portion of the DL when no SFI is detected. At 406, the UE may cancel the portion of the transmission.

Figure 5:
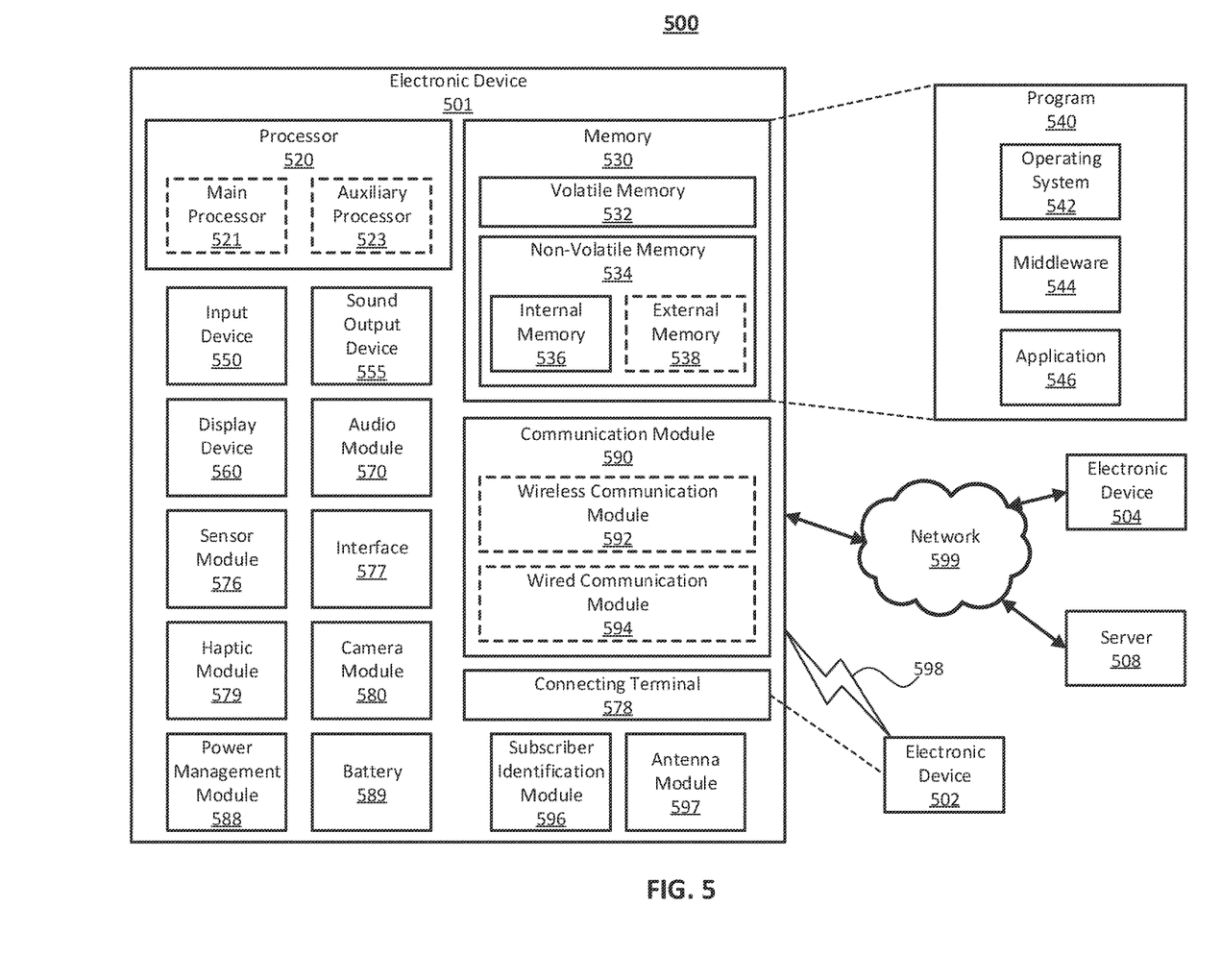
FIG. 5 illustrates a block diagram of an electronic device in a network environment, according to one embodiment.

FIG. 5 illustrates a block diagram of an electronic device 501 in a network environment 500, according to one embodiment. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In one embodiment, at least one (e.g., the display device 560 or the camera module 580) of the components may be omitted from the electronic device 501, or one or more other components may be added to the electronic device 501. In one embodiment, some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute, for example, software (e.g., a program 540) to control at least one other component (e.g., a hardware or a software component) of the electronic device 501 coupled with the processor 520, and may perform various data processing or computations. As at least part of the data processing or computations, the processor 520 may load a command or data received from another component (e.g., the sensor module 576 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to one embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to one embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to one embodiment, the audio module 570 may obtain the sound via the input device 550, or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. According to one embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. According to one embodiment, the connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. According to one embodiment, the haptic module 579 may include, for example, a motor, a piezoelectric element, or an electrical stimulator.

The camera module 580 may capture a still image or moving images. According to one embodiment, the camera module 580 may include one or more lenses, image sensors, image signal processors, or flashes.

The power management module 588 may manage power supplied to the electronic device 501. The power management module 588 may be implemented as at least part of, for example, a power management integrated circuit (PMIC).

The battery 589 may supply power to at least one component of the electronic device 501. According to one embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. According to one embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to one embodiment, the antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

One embodiment may be implemented as software (e.g., the program 540) including one or more instructions that are stored in a storage medium (e.g., internal memory 536 or external memory 538) that is readable by a machine (e.g., the electronic device 501). For example, a processor of the electronic device 501 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a user equipment (UE) in a wireless communication network, the method comprising:
   receiving, from the network, a downlink (DL) transmission, a first portion of the DL transmission overlapping at least a portion of a channel status information (CSI)-reference signal (RS);
   determining, by the UE, that a second portion of the DL transmission does not overlap with the CSI-RS; and
   allowing, by the UE, the first and second portions of the DL transmission in response to the determination that the second portion of the DL transmission does not overlap with the CSI-RS.

2. The method of claim 1, wherein the first and second portions of the DL transmission are cancelled when a part of the DL transmission is not within a channel occupancy time (COT).

3. The method of claim 2, further comprising monitoring, by the UE, downlink control information (DCI),
   wherein the COT is indicated in the DCI.

4. The method of claim 1, further comprising configuring a timer for a predetermined duration,
   wherein the first and second portions of the DL transmission are cancelled when a part of the DL transmission occasion is not within the predetermined duration.

5. The method of claim 4, wherein the timer comprises a timer introduced for switching groups of search space sets.

6. The method of claim 1, wherein the first and second portions of the DL transmission are cancelled when the DL transmission does not overlap with a set of DL transmissions with a gap.

7. The method of claim 1, wherein the first and second portions of the DL transmission is determined to be cancelled when the DL transmission is not between a detected downlink control information (DCI) and a scheduled physical downlink shared channel (PDSCH).

8. The method of claim 1, wherein the first and second portions of the DL transmission are cancelled when any part of the DL transmission is not within a transmission duration.

9. The method of claim 8, wherein the UE comprises a frame based equipment (FBE).

10. The method of claim 1, further comprising monitoring, by the UE, for a slot format indicator (SFI),
wherein the first and second portions of the DL transmission are cancelled when no SFI is detected.

11. A user equipment (UE), comprising:
a transceiver;
a memory; and
a processor configured to:
receive, from a network, a downlink (DL) transmission, a first portion of the DL transmission overlapping at least a portion of a channel status information (CSI)-reference signal (RS);
determine that a second portion of the DL transmission does not overlap with the CSI-RS; and
allowing the first and second portion of the DL transmission in response to the determination that the second portion of the DL transmission does not overlap with the CSI-RS.

12. The UE of claim 11, wherein the first and second portions of the DL transmission are cancelled when a part of the DL transmission is not within a channel occupancy time (COT).

13. The UE of claim 12, wherein the processor is further configured to monitor downlink control information (DCI), wherein the COT is indicated in the DCI.

14. The UE of claim 11, wherein the processor is further configured to set a timer for a predetermined duration,
wherein the first and second portions of the DL transmission are cancelled when a part of the DL transmission occasion is not within the predetermined duration.

15. The UE of claim 14, wherein the timer comprises a timer introduced for switching groups of search space sets.

16. The UE of claim 11, wherein the first and second portions of the DL transmission are cancelled when the DL transmission does not overlap with a set of DL transmissions with a gap.

17. The UE of claim 11, wherein the first and second portions of the DL transmission are cancelled when the DL transmission is not between a detected downlink control information (DCI) and a scheduled physical downlink shared channel (PDSCH).

18. The UE of claim 11, wherein the first and second portions of the DL transmission are cancelled when any part of the DL transmission is not within a transmission duration.

19. The UE of claim 18, wherein the UE comprises a frame based equipment (FBE).

20. The UE of claim 11, wherein the processor is further configured to monitor for a slot format indicator (SFI),
wherein the first and second portions of the DL transmission are cancelled when no SFI is detected.

* * * * *

UNITED STATES PATENT AND TRADEMARK OFFICE
CERTIFICATE OF CORRECTION

| | | |
|---|---|---|
| PATENT NO. | : 11,659,547 B2 | Page 1 of 1 |
| APPLICATION NO. | : 17/130437 | |
| DATED | : May 23, 2023 | |
| INVENTOR(S) | : Jung Hyun Bae et al. | |

It is certified that error appears in the above-identified patent and that said Letters Patent is hereby corrected as shown below:

In the Claims

In Column 13, Line 15, in Claim 11:
"allowing the first and second portion of the DL trans-"
Should be:
-- allowing the first and second portions of the DL trans- --

Signed and Sealed this
Twenty-first Day of May, 2024

Katherine Kelly Vidal
*Director of the United States Patent and Trademark Office*